Figure 5:
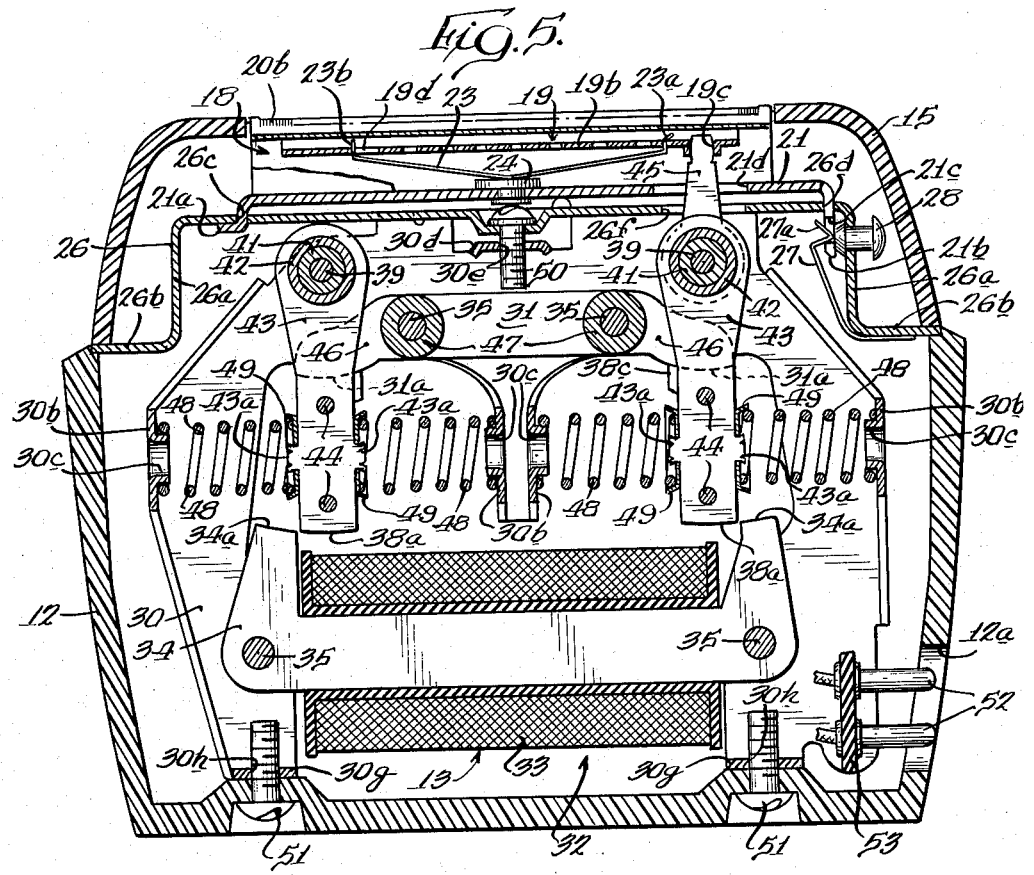

March 29, 1966     I. JEPSON ETAL     3,243,615
DUAL ARMATURE RECIPROCATING MOTOR
Filed Dec. 23, 1960     3 Sheets-Sheet 1
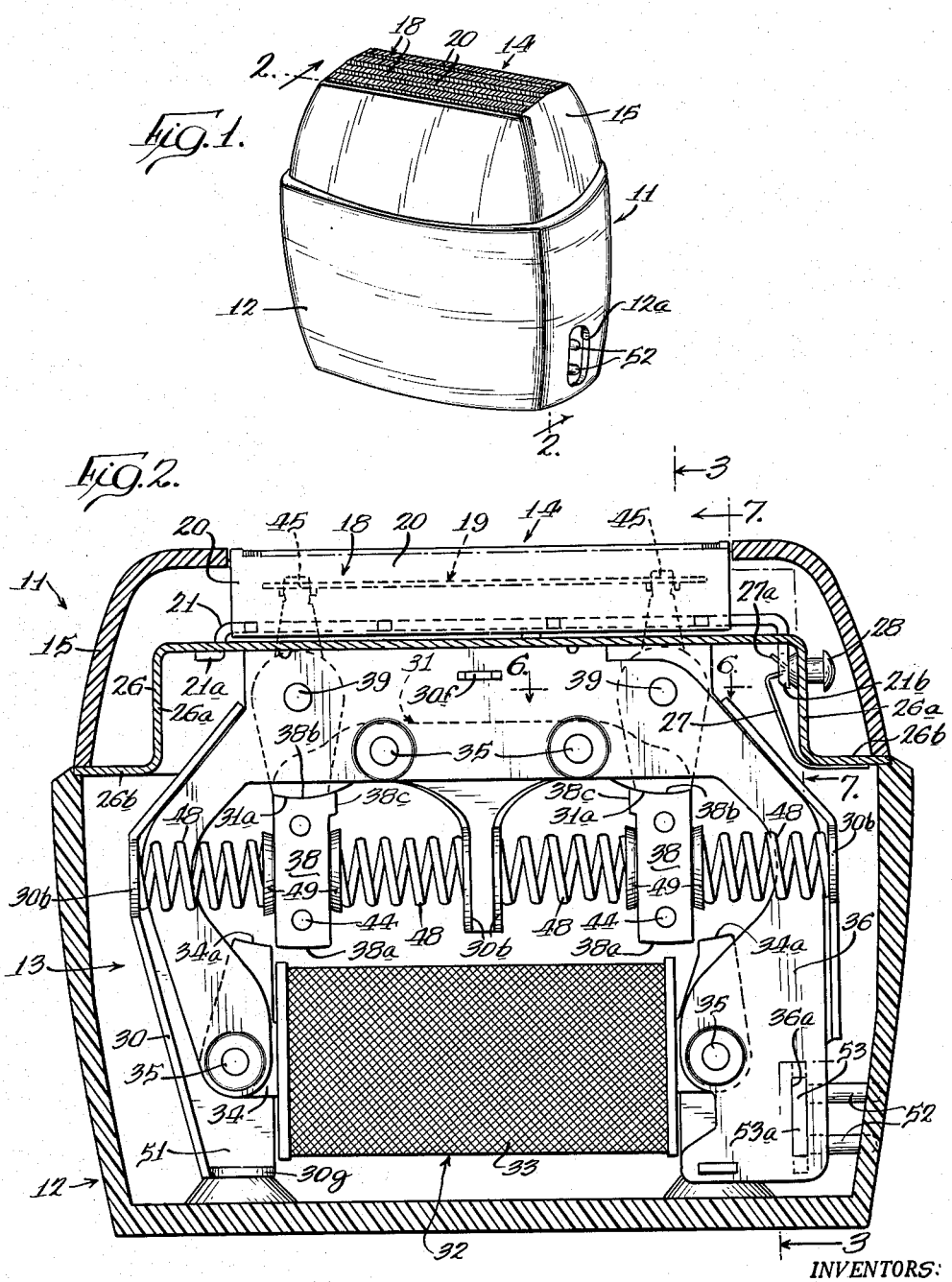

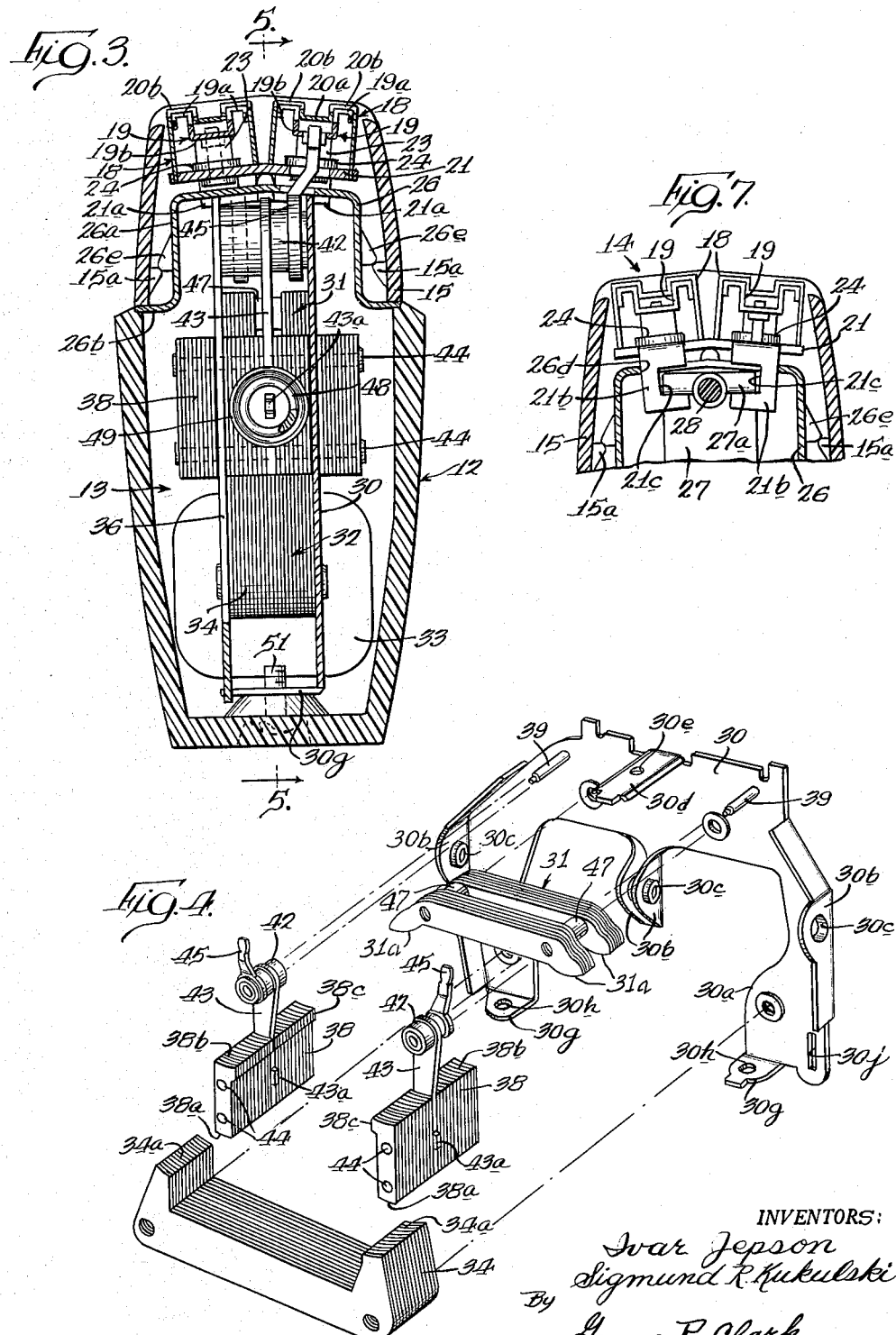

March 29, 1966 I. JEPSON ETAL 3,243,615
DUAL ARMATURE RECIPROCATING MOTOR
Filed Dec. 23, 1960 3 Sheets-Sheet 3

INVENTORS:
Ivar Jepson
Sigmund R. Kukulski
By George R. Clark Atty

3,243,615
DUAL ARMATURE RECIPROCATING MOTOR
Ivar Jepson, Oak Park, and Sigmund R. Kukulski, Chicago, Ill., assignors to Sunbeam Corporation, Chicago, Ill., a corporation of Illinois
Filed Dec. 23, 1960, Ser. No. 78,005
6 Claims. (Cl. 310—29)

The present invention relates generally to dry shavers and more particularly to dry shavers having multiple heads driven by an electromagnetic motor.

It is well known in the art to provide dual head shavers with drive means which reciprocate the cutters of the two heads in opposite directions. In a shaver having a rotating armature, there is little advantage in such an arrangement since the cutter portions of the shearing heads are so light in weight that the vibration forces produced by reciprocating the heads in unison are not objectionable. There are, however, certain types of electromagnetic motors used in connection with electric shavers which produce undesirable vibration forces. These motors are of the type which have oscillating or vibrating rather than rotating armatures. While these motors are inherently limited to use on alternating or pulsating power supplies, they have many attractive aspects which have led to their widespread use on electric shavers and hair clippers. These aspects include their simplicity in design and the absence of any brushes or breaker points to cause malfunctioning. Because of the very light weight of electric shavers, the bivration or reaction forces produced by the oscillating armatures are particularly noticeable and undesirable.

In the United States Patent No. 2,299,952 to Jepson, there is disclosed an electromagnetic motor in which the armature is mounted by means of a reed-like spring member. To minimize vibration effects of the vibrating armature in that motor, an idler armature was utilized which vibrated out of phase with the driving armature. The electromagnetic motor of the present invention differs from the one disclosed in the above-mentioned Jepson patent in that two armatures are employed, both of which are drivingly related to a separate shearing head. In addition, the armatures are pivotally supported by means of rigid arms rather than the flexible springs disclosed in the Jepson patent.

Our copending application Serial No. 544,212, filed November 1, 1955, now Patent No. 3,072,809, issued January 8, 1963 on "Electrically Operated Hair Clipping and Shaving Device" is directed to a dry shaver having a single shaving head driven by a motor having a single armature pivotally supported by a rigid arm. The present invention provides a means of driving a two-headed shaver with a motor of the type having an oscillating armature, while, at the same time, providing means for eliminating the vibration effects normally associated with such motors.

It is accordingly an object of the present invention to provide an improved electric dry shaver having more than one head and powered by an electromagnetic motor of the oscillating armature type.

It is a further object of the present invention to provide an electric shaver having two shearing heads, the cutters of which are individually driven by separate oscillating armatures.

It is an additional object of the present invention to provide an electromagnetic motor having two pivotally mounted armatures driven in an out of phase relation and drivingly connected to separate shaving heads.

It is a further object of the present invention to provide a motor having several oscillating armatures and a field arranged with the armatures in series in the magnetic circuit including the field.

Further objects and advantages of the present invention will became apparent as the following description proceeds and the features of novelty which characterize the invention will be pointed out with particularity in the claims annexed to and forming a part of this specification.

Figure 6:
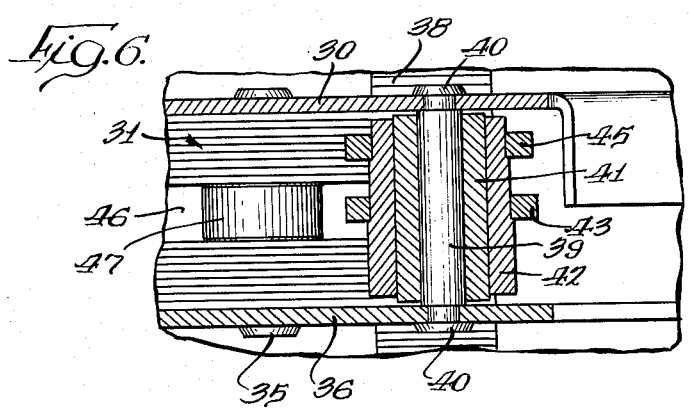

For a better understanding of the present invention, reference may be had to the accompanying drawings in which:

FIG. 1 is a perspective view of a dry shaver embodying our invention;
FIG. 2 is an enlarged sectional view of the dry shaver taken on line 2—2 of FIG. 1;
FIG. 3 is a sectional view taken on line 3—3 of FIG. 2;
FIG. 4 is an exploded perspective view of some of the parts of the dry shaver motor;
FIG. 5 is a sectional view taken on line 5—5 of FIG 3;
FIG. 6 is an enlarged fragmentary sectional view taken on line 6—6 of FIG. 2; and
FIG. 7 is a sectional view taken on line 7—7 of FIG. 2.

The present invention is concerned with a dry shaver having two shaving heads which are driven by separate armatures in an electromagnetic motor. The cutter portions of the heads are reciprocated in opposite directions by the armatures which oscillate in opposite directions to balance out vibration forces. The two armatures are arranged in series in the magnetic circuit of the motor to reduce the problems of interaction between the two armatures.

Referring now to the drawings, there is illustrated an electric dry shaver generally designated by the reference numeral 11. The dry shaver 11 includes a cup-shaped casing 12 within which an electromagnetic motor 13 is mounted. The motor 13 is drivingly related to a pair of shearing heads 14 mounted at the upper end of the casing 12. For the purpose of retaining the clipped hair and to provide an enclosure for the shaving heads, a sleeve member or hair retainer 15 is positioned abutting the upper edge of the casing 12 and enclosing the lower portions of the shaving heads 14. As may be seen in FIG. 1, the upper surfaces of the shaving heads 14 are exposed to permit engagement thereof with the face of the user.

Each of the shaving heads includes an outer comb member 18 and an inner reciprocating cutter 19. The comb is a two-piece member including an upper inverted U-shaped member 20 which is secured by spot welding or other suitable means to a plate-like base 21. There may be a separate base 21 for each comb 18, or as shown in FIGS. 3 and 7, a single plate member may serve as the base for both combs. Each of the U-shaped comb members 20 has a central channeled portion 20a which provides greater rigidity for the comb and increases the number of effective shearing positions as will be explained below. The upper faces of the comb member 20 are slotted transversely on either side of the longitudinally extending channel 20a to form cutting teeth 20b. The cutter 19 positioned to reciprocate within the tubular comb 18 has two rows of cutting teeth 19a which reciprocate in shearing engagement with the comb teeth 20b. The center portion of the cutter between the rows of teeth 19a is formed in a longitudinally extending channel 19b which straddles the channel portion 20a on the U-shaped comb member. Since most of the cutting of whiskers occurs at the ends of the cutter teeth 19a where they engage the comb teeth 20b, the arrangement including rows of teeth separated by the channels has been found to be more efficient than an unchanneled head in that the channels double the number of positions at which whiskers may be cut.

As may best be seen in FIG. 5, one end of the cutter 19 is provided with an opening 19c. The means for reciprocating the cutter 19 extends through the opening 19c for driving engagement with the channel portion 19b.

To bias the cutter 19 into engagement with the comb member 20, there is provided a V-shaped spring 23 which acts between the comb base 21 and the channel portion 19b of the cutter. One end of the cutter spring 23 is formed with a hook-shaped portion 23a which is received through a slot in the channel 19b. The other end of the cutter spring 23 has a tab portion 23b of reduced width which extends upwardly through an elongated slot 19d in the channel 19b. Shoulders adjacent the tab 23b engage the walls of the channel adjacent the slot 19d. The purpose of the slot 19d is to permit the end of the spring 23 including the tab 23b to move inwardly under varying spacings between the cutter and the comb base. At the center of the comb base 21 a nylon bearing pad 24 is secured thereto by staking over the lower end of the bearing pad 24 which extends through the comb base 21. The spring 23 bears against the pad 24 providing a low friction bearing engagement between the two parts.

To mount the shaving heads 14 with respect to the casing 12, a head supporting member 26 is utilized. The head supporting member is somewhat cup-like in shape having vertically extending peripheral walls 26a and a peripheral flange 26b extending outwardly from the lower edges of the walls 26a into abutting engagement with the upper edges of the casing 12. To retain the heads assembled to the head supporting member 26, the end of the comb base 21 is formed with hinge projections 21a and latch projection 21b. Each hinge projection 21a takes the form of an L-shaped member which extends downwardly and rearwardly from the end of the comb and is received in a slot 26c in the upper wall of the supporting member 26. In assembling the hinge projections 21a to the head supporting member 26, the heads 14 are positioned vertically while the longitudinally extending portions of projections 21a are threaded through the slots 26c. The heads 14 are then rotated toward the supporting member, thus positioning the hinge projections 21a into locking engagement with the upper wall of the head supporting member 26.

To retain the other ends of the heads against pivoting upwardly, the latch projections 21b are received in a latch slot 26d in the head supporting member 26. Inside the vertical wall 26a of the head supporting member 26 a latch spring 27 is positioned for retaining engagement with the latch projections 21b. The latch spring 27 is substantially L-shaped having the lower leg thereof secured by welding or any suitable means to the peripheral flange 26b of the head supporting member 26. The upwardly extending leg of the latch spring 27 is formed with a hook 27a at its upper end which is adapted to be received in slots 21c formed in the latch projections 21b. Thus, it may be seen that as the heads 14 are rotated downwardly against the head supporting member 26, the latch projections 21b enter the slot 21d into engagement with the latch spring 27. As the latch projection 21b continues to move downwardly, the hook portion 27a of the latch spring 27 is biased away from the adjacent wall 26a until the hook snaps into engagement with the slot 21c therein. To disengage the latch spring 27 from the latch projections 21b, a release button 28 is mounted in the wall 26a adjacent the latch spring 27. The release button may merely comprise a molded nylon member extending through an opening in the wall 26a with the inner end deformed to retain it in assembled relation to the head supporting member 26. As may best be seen in FIG. 7, the release button 28 engages the spring 27 intermediate between the two latch projections 21b thereby permitting deflection of the spring 27 and disengagement of the hook portion 27a from the slots 21c.

As was mentioned briefly above, the sleeve or hair retainer 15 encloses the lower portions of the shaving heads 14. As is evident from FIG. 2, any cut whiskers which move longitudinally out of the ends of the tubular combs 18 merely fall within the enclosure defined by sleeve 15 in the head supporting member 26. The cup-shaped configuration of the head supporting member 26 cooperates with the sleeve 15 to provide a compact head mounting while including ample space for storage of clipped whiskers or hair. The motor 13 extends upwardly within the head supporting member 26 while the space surrounding is utilized for hair storage. The outer dimensions of the shaver may be maintained at a minimum and the space within the housing utilized most efficiently.

To retain the sleeve 15 assembled to the shaver, the sleeve 15 is provided with integrally molded projections 15a which extend inwardly and enter into locking engagement with projections 26e formed in the walls 26a of the head supporting member as is best shown in FIG. 3. The sleeve 15 is formed of a resilient plastic material which deforms sidewardly as the sleeve is assembled to the housing permitting the projections 15a to move over and into locking engagement with the projections 26e. When it is desired to remove the sleeve 15, pressure is merely applied to the opposite ends of the sleeve causing the centermost portion where the projections 15a are located to bow outwardly and disengage from the projections 26e. Thus, there is provided a simple and effective means of removably securing the hair retainer 15 to the shaver casing.

Positioned within the enclosure defining the cup-shaped casing 12 and the head supporting member 26 is the motor 13. All of the elements of the motor are supported by means of motor frame 30 which is fabricated of a nonmagnetic material such as brass or the like and is best shown in FIG. 4. The motor stator or field which is secured to the frame 30 is made up of an upper field core 31 and a lower field 32. The lower field 32 includes a field coil 33 and a U-shaped core 34 upon which the field coil 33 is mounted. At the end of each of the upwardly extending legs of the U-shaped core 34 there is a pole face 34a which is of cylindrical section. The upper field core 31 is similarly provided with spaced pole faces 31a which will be described in greater detail below. The upper and lower field cores 31 and 34 are formed of stacks of laminations of magnetic material assembled together by means of rivets 35 which also retain the laminations assembled to the motor frame 30. The coil 33 is of conventional construction including a plurality of turns of fine, insulated copper wire wound on an insulating bobbin. As may best be seen in FIG. 4, the center portion of the motor frame 30 is cut away at 30a to provide clearance for the field coil 33 and also for the motor armatures as will be explained below.

Cooperating with the motor frame 30 to support the elements of the motor there is a second frame or bracket 36 which extends generally parallel to the motor frame 30. The motor bracket 36 is assembled to the upper and lower field cores by means of the field assembly rivets 35 mentioned above. Positioned for oscillation between the above-mentioned pole faces 31a and 33a are two armatures 38 which are identical in shape. To support the armatures 38, a pair of shafts 39 are employed which extend between the motor frame 30 and the motor bracket 36. As is best illustrated in FIG. 6, the armature supporting shafts 39 have ends of reduced diameter which are provided with peened over portions 40 to assemble them to the frame 30 and the bracket 36. Received on each of the armature shafts 40 are elongated sleeve bearings 41 on which are journaled armature supporting bushings 42.

The armatures 38 are secured to the bushings 42 by supporting arms 43, the ends of which are brazed or otherwise secured to the bushings 42. The armatures 38 are made up of a plurality of laminations of magnetic material which are retained together by means of rivets 44. Each support arm 43 is positioned in the middle of the lamination stack and, therefore, the rivets 44 also retain the laminations assembled to the drive arms 43.

To drivingly relate the armatures with the shaving heads, a drive arm 45 is brazed or otherwise secured to each of the armature bushings 42. As may be seen in FIGS. 4 and 6, the armature support arms 43 are secured to the center of the armature bushings 42 while the drive arms are secured adjacent the ends thereof. While the two armature assemblies including the armatures 38, the support arms 43, the bushings 42 and drive arms 45 are identical, they are reversed to appear in allochiral relation as viewed in FIGS. 2, 3 or 5. The drive arms 45 are displaced from the center line of the armature so as to permit a simple driving engagement with the two transversely spaced shearing heads. As may best be seen in FIG. 5, the drive arm 45 extends upwardly through the opening 19c in the cutter 19 to achieve driving engagement therewith. The comb base 21 is provided with slots 21d through which the drive arms 45 extend. In addition, the head supporting member 26 has a pair of slots 26f to permit the drive arms to extend upwardly therethrough.

In that the armatures 38 are pivoted from axes above the upper field core 31, it is necessary for the core 31 to have a clearance slot 46 formed therein in which the armature support arms 43 may oscillate. As may be best seen in FIG. 6, the laminations of the upper field core 31 are separated by means of a pair of spacers 47 which are received on the field assembly rivets 35, thereby maintaining the clearance slot 46.

As was explained above, the upper and lower field cores are formed with pole faces 31a and 34a, respectively, which are generally cylindrical in section. The axis of the cylindrical sections defining the field pole faces are coincident with the axis about which the corresponding armature oscillates. Each armature 38 is formed with upper and lower salient poles 38b and 38a which are cylindrical sections, the lower pole being convex and the upper pole concave. The axis of the cylindrical poles of each armature is also coincident with the axis of oscillation of the respective armature.

It should be understood that the armatures 38 are biased to rest or neutral positions in which the lower armature pole faces 38a are out of alignment with the field pole faces 34a. Thus, when the field coil 33 is energized by an alternating or pulsating current, the magnetic flux produced at the pole faces 34a will tend to draw the armatures 38 into alignment with the adjacent field pole faces. Since the torque produced in such a magnetic circuit is proportional to the rate of change of flux in the air gap, it is advantageous to have the armature well spaced from the pole face initially, and, at the end of its movement, in a position of minimum reluctance with as small an air gap as possible between the armature and the field pole faces.

With respect to the armature poles 38b and the upper field pole faces 31a, an attempt has been made to maintain a continuously low reluctance magnetic path therebetween. Thus, substantially all of the torque is produced at the lower field pole face while the little or no torque is produced at the upper field pole faces 31a which are close to the pivot point of the armatures 38. The considerations involved in not attempting to obtain any torque at the air gap closest to the armature pivot is discussed in detail in our Patent No. 3,072,809, issued January 8, 1963. It should also be noted that both of the armatures 38 are provided with a laterally extending projection 38c along the upper pole face 38b. The purpose of this projection is merely to maintain a minimum reluctance path even when the armature has pivoted outwardly at which time the pole faces 38a and 34a are in alignment. The use of such a projection or L-shaped lamination as it has been characterized in the above-mentioned copending application is discussed in detail therein.

To bias the armature 38 to their rest or neutral positions in which they are out of alignment with the lower field pole faces 34a, a plurality of helical springs 48 are employed. One end of each of the springs is adapted to act against one side of one of the armatures 38. To hold the springs 48 in aligned engagement with the armatures 38, there are provided cup-shaped spring retainers 49. The support arms have integral projections 43a which extend through openings in the spring retainers 49 and are staked over to secure the spring retainers thereon. As may best be seen in FIG. 5, the end turn of each of the springs 48 adjacent each armature is received in a cup-shaped spring retainer 49 and thereby retained in proper alignment.

The other end of each of the springs is supported by an integral projection 30b extending outwardly from the motor frame 30. Each of the projections 30b is formed with a drawn sleeve-like portion 30c which extends inside the end turn of a spring 48 and retains it thereon. By forming the spring supporting projections 30b integrally with the motor frame 30, we have provided an effective means of maintaining the armature biasing springs in position with the utilization of a minimum number of parts.

The motor frame 30 actually serves to relate the casing 12 and the shaving heads 14 in a simple manner which require few externally visible assembly means. As may be seen in FIG. 4, the motor frame 30 has at its upper end a transversely extending lug 30d which has a threaded opening 30e at its midpoint. The opening 30e is designed to receive an upper assembly screw 50 which extends through the head supporting member 26 and retains it in engagement with the upper edge of the casing 12. The forwardly extending portion of the head assembly lug 30d has its end reduced in width and extending through an opening in the motor bracket 36, the end being provided with a peened over portion 30f as indicated in FIG. 2.

To assemble the motor 13 within the casing 12, the motor frame 30 has a pair of inwardly extending motor supporting lugs 30g positioned at the lower edge thereof. The motor supporting lugs 30g have tapped holes 30h formed therein which receive motor assembly screws 51. The motor assembly screws 51 extend through openings in the bottom of casing 12 and have their heads recessed therein as is best shown in FIG. 5.

It should be understood that the screws 51 draw the motor frame 30 downwardly against the upward force delivered through the screw 50 which secures the cup-shaped head supporting member 26 to the motor 13. Thus with the head supporting member 26 engaging the upper lip of the housing 12, the motor frame 30 is tensioned between the head supporting member 26 and the screws 51 which extend through the bottom of housing 12.

To permit connection of the conventional power supply cord to the motor, the casing 12 is formed with an opening 12a as shown in FIG. 5. In alignment with the opening 12a there are positioned a pair of outwardly extending terminal pins 52. The terminal pins 52 are mounted on an insulating supporting member 53. Extending outwardly from the sides of the insulating supporting member 53 are supporting lugs 53a. The motor frame 30 is provided with an opening 30j into which one of the lugs 53a extends while the motor bracket 36 has a corresponding opening 36a through which the other lug 53a extends. Thus, the terminal supporting member is firmly supported between the motor frame 30 and the motor bracket 36. Suitable electrical connectors are provided between the terminal pins 52 and the coil 33.

It should be appreciated that the two armatures 38 oscillating in opposite directions, or out of phase, drive their corresponding cutters 19 in opposite directions. As a result the vibration forces produced by the oscillating armatures and the reciprocating cutters are balanced out or nullified. It should also be appreciated that the series arrangement of the two field members and the two armatures provide an improved magnetic circuit. Substantially all of the flux produced in the lower field core 34 by the coil 33 tends to flow through both of the two armatures. If a parallel arrangement of the armatures such as is shown in Jepson Patent No. 2,299,952 is employed in the magnetic circuit, differences in the positioning or construction of the armatures would tend to unbalance the amounts of flux passing through the two armatures.

To better understand the difference between the series and parallel magnetic circuits in a dual armature motor, it may be well to consider what happens in the two types of motors if there are variations in their armatures or the biasing springs associated therewith. Ideally, both armatures should move in synchronism, receiving equal amounts of flux from the field and delivering equal power. Considering two armatures in a parallel arrangement, we must assume that one of the armatures will be attracted to the aligned position with the field poles more rapidly than the other armature. The armature which begins moving toward the aligned position more quickly will receive an increasing percentage of the available flux and therefore accelerate more rapidly toward the aligned position with the field poles. The other armature which moves more slowly initially will receive a smaller percentage of the flux because of the increased amount of flux being received by the faster moving armature. Thus, the error tends to be cumulative whereby relatively minor differences between the armatures and their natural frequencies of oscillation will be accentuated by the effect of the parallel arrangement in the magnetic circuit.

In contrast, the series arranged armatures may have substantially different natural or resonant frequencies and still operate in synchronism and deliver substantially equal amounts of power. If we assume that one of the armatures 38 in the above-described motor moves more rapidly toward the position of alignment with the field poles, it is obvious that the reluctance at the field pole face adjacent the faster moving armature will have been decreased permitting more flux to pass through the field members to the other slower moving armature. This increase in flux will accordingly increase the speed of the slower armature to such an extent that it will catch up and move substantially in synchronism with the faster moving armature. The result is that the series arrangement permits wider manufacturing tolerances while still achieving good synchronism and equal power distribution between the two armatures.

The double armature motor described above might also be used in connection with a shaver having three or more cutter heads. If an even number of heads are used, no problem arises as to balancing vibrations. If an odd number of heads is used, means must be provided to compensate for the different numbers of cutters moving in each direction. In a three-head application, one of the armatures would be provided with two drive arms interconnecting the bushing 42 with the cutters on the two cutter heads while the other armature would drive the center cutter. To compensate for the difference in weight between the two cutters moving in one direction and the one cutter moving in the other direction, the armature driving one cutter is provided with springs tuned closer to the source frequency so that it would have a greater oscillation than the other armature. This greater oscillation coupled with the increased cutter stroke would balance out the greater weight of the two cutter portions of the system, producing a vibration free motor. The same principle applied to the three-head shaver could also be used on five or seven head shavers.

While the invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. An electromagnetic motor comprising a pair of spaced field members, a pair of movably mounted armatures, said field member having opposed pole faces, coil means for producing magnetic flux in one of said field members, each of said armatures being movable between a pair of opposed field pole faces providing a series magnetic circuit in which said magnetic flux passes from said one field member through one of said armatures through the other field member and then through the other armature.

2. An electromagnetic motor comprising a pair of movably mounted armatures, resilient means biasing said armatures to neutral position, a motor stator for producing magnetic flux, and pole faces on said stator arranged to produce a magnetic field to oscillate said armatures in opposite directions from said neutral positions, said stator and said armatures forming a series magnetic circuit wherein substantially all of said flux passes through each of said armatures.

3. An electromagnetic motor comprising a pair of armatures pivotally mounted for oscillation about a pair of spaced axes, resilient means biasing said armatures to neutral positions, motor field means having a plurality of pole faces toward which one end of each said armature is rotated when said field means is energized, said field means including a member of low magnetic reluctance extending between the other ends of said armatures, said armatures being mounted in series magnetic circuit with said field means whereby substantially all of the flux emanating from said pole faces passes through each armature.

4. An electromagnetic motor comprising a pair of spaced field members and a pair of armatures supported between a pair of nonmagnetic frame members, one of said field members having poles at both ends thereof and a coil for producing magnetic flux therein, means supporting said armatures for oscillation about parallel spaced axes, the other of said field members extending between said armatures adjacent their axes to provide a low reluctance path between said armatures, and resilient means biasing said armatures to rest position adjacent said field poles, energization of said coil causing said armatures to rotate in opposite directions from said rest positions, said field members and said armatures forming a series magnetic circuit wherein substantially all of said flux passes through each of said armatures.

5. An electromagnetic motor comprising a first U-shaped field member having a pair of field poles formed by the outwardly extending legs thereof and coil received on the bight portion thereof, a second field member extending parallel to the axis of said coil and having the ends thereof spaced from said field poles, a pair of armatures supported for oscillation about spaced parallel axes each of which is positioned adjacent one end of said second field member, said armatures being positioned to oscillate in close proximity to said second field member providing a low reluctance magnetic path between said armatures, resilient means biasing said armatures to rest positions spaced from said field poles, energization of said coil causing said armatures to rotate in opposite directions from said rest positions into alignment with said field poles, said field members and said armatures forming a series magnetic circuit wherein substantially all of the flux produced by said coil passes through each of said armatures.

6. An electromagnetic motor comprising a first U-shaped field member having a pair of field poles formed by the outwardly extending legs thereof and coil received on the bight portion thereof, a second field member extending parallel to the axis of said coil and having the ends thereof spaced from said field poles, a pair of armatures supported for oscillation about spaced parallel axes each of which is positioned adjacent one end of said second field member, said armatures being positioned to oscillate in close proximity to said second field member providing a low reluctance magnetic path between said armatures, a pair of parallel nonmagnetic frame members positioned on either side of said members to support said field members and armatures, resilient means biasing said armatures to rest positions spaced from said field poles, said resilient means including four axially aligned helical springs engaging mounting cups on said armatures and seats provided on said frame members, energization of said coil causing said armatures to rotate in opposite directions from said rest positions into alignment with said field poles, said field members and said armatures forming a series magnetic circuit wherein substantially all of the flux produced by said coil passes through each of said armatures.

References Cited by the Examiner

UNITED STATES PATENTS

| | | | |
|---|---|---|---|
| 2,239,931 | 4/1941 | Prescott | 310—29 |
| 2,573,758 | 11/1951 | Bailey | 30—43 |
| 2,698,393 | 12/1954 | Merkle | 310—89 |
| 2,814,866 | 12/1957 | Bagno | 30—43 |
| 2,908,074 | 10/1959 | Kleinman | 30—41.6 |
| 2,741,711 | 4/1960 | Megernik | 310—29 |
| 2,932,750 | 4/1960 | Eisenhart | 310—89 |

FOREIGN PATENTS 1,005,404  3/1957  Germany.

ORIS L. RADER, *Primary Examiner.*

MILTON O. HIRSHFIELD, EDWARD V. BENHAM, *Examiners.*

C. W. DAWSON, M. C. KRUSE, *Assistant Examiners.*